United States Patent [19]

Lee et al.

[11] Patent Number: 4,727,223

[45] Date of Patent: Feb. 23, 1988

[54] ELECTRICAL PENETRATOR

[75] Inventors: Lawrence C. Lee; Francis T. Traylor, both of Bartlesville, Okla.

[73] Assignee: TRW Inc., Cleveland, Ohio

[21] Appl. No.: 62,582

[22] Filed: Jun. 16, 1987

[51] Int. Cl.[4] ....................... H02G 3/22; H01B 17/30; G21C 13/04

[52] U.S. Cl. .................................... 174/151; 376/203; 376/463

[58] Field of Search ............. 174/77 R, 151; 376/203, 376/204, 463

[56] References Cited

U.S. PATENT DOCUMENTS

| | | | |
|---|---|---|---|
| 3,601,526 | 8/1971 | Bohne et al. | 174/151 |
| 3,670,091 | 6/1972 | Frantz et al. | 174/52 PE |
| 3,828,118 | 8/1974 | Bushek et al. | 174/11 R |
| 3,856,983 | 12/1974 | Fisher et al. | 174/151 |
| 3,895,831 | 7/1975 | Fisher | 174/151 X |
| 4,012,282 | 3/1977 | Hutter et al. | 376/203 |
| 4,049,856 | 9/1977 | Adams | 428/131 |
| 4,180,211 | 12/1979 | Olcott et al. | 239/265.43 |
| 4,227,043 | 10/1980 | Stöhr et al. | 174/151 |
| 4,237,336 | 12/1980 | Kostjukov et al. | 174/151 |
| 4,252,993 | 2/1981 | Beaman | 174/151 |
| 4,267,401 | 5/1981 | Wilkinson | 174/77 R |
| 4,309,568 | 1/1982 | Isaksson | 174/151 |
| 4,333,706 | 6/1982 | Davis et al. | 350/96.23 |
| 4,427,842 | 1/1984 | Anderson | 174/77 R |
| 4,454,381 | 6/1984 | Ito et al. | 174/151 |
| 4,485,192 | 11/1984 | Gibbs et al. | 521/54 |
| 4,580,794 | 4/1986 | Gibbons | 277/228 |

FOREIGN PATENT DOCUMENTS

| | | | |
|---|---|---|---|
| 890076 | 9/1953 | Fed. Rep. of Germany | 174/151 |
| 175198 | 3/1961 | Sweden | 174/151 |
| 182515 | 2/1963 | Sweden | 174/151 |
| 2115238 | 9/1983 | United Kingdom | 174/151 |

*Primary Examiner*—Laramie E. Askin

*Attorney, Agent, or Firm*—Shapiro and Shapiro

[57] ABSTRACT

An electrical penetrator employs metal-sheathed insulated conductors that extend completely through and are sealed within a tubular housing. A filler block is disposed centrally within the housing and is surrounded by elastomeric material of a sealing member. Plugs are inserted into opposite ends of the housing so as to compress the elastomeric material and are sealed within the housing. Hollow end caps threaded into the opposite ends of the housing urge the plugs toward the elastomeric material. The metal-sheathed conductors extend through the hollow end caps and through longitudinal passages in the plugs and the sealing member. The conductors are sealed in the sealing member by the elastomeric material, are sealed in the plugs by tube fitting assemblies threaded into the plugs about the conductors, and are sealed in the hollow end caps by potting material. Expansion or swelling of the elastomeric material is accommodated by a space in the housing but is resiliently restrained by a metal spring to prevent seal failure due to a compression set of the elastomeric material.

12 Claims, 4 Drawing Figures

FIG. 2.
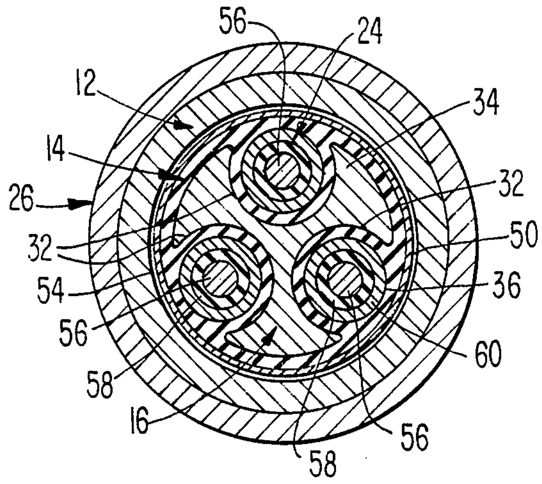
FIG. 3.
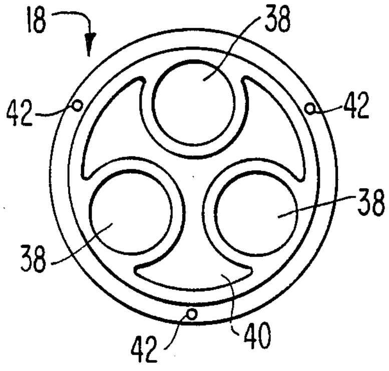
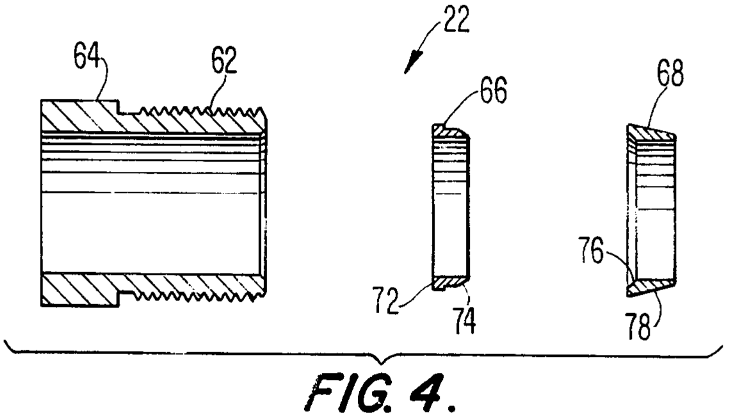
FIG. 4.

ELECTRICAL PENETRATOR

BACKGROUND OF THE INVENTION

This invention relates to electrical penetrators, sometimes referred to as feedthrough devices.

Electrical penetrators are used to transmit electricity, usually at high voltage and high amperage (e.g., 5,000 volts at 150 amperes) through barrier walls of bulkheads, pressure vessel housings, wellheads, downhole packers, etc. Frequently, the penetrators are subjected to high and variable pressure differentials that exist across the barrier walls, in addition to high and variable temperatures. A penetrator must be able to maintain a pressure seal and electrical integrity in hostile environments while operating to conduct electricity, and also while not operating.

A typical existing penetrator design for downhole use comprises three major parts—a power feedthrough mandrel in the middle of the device, a surface plug connector at the top of the mandrel (that is spliced to the surface power cable), and a lower plug connector at the bottom of the mandrel (that is spliced to the downhole power cable). The mandrel comprises electrical conductors insulated with rubber and molded in place within a shell by epoxy, for example. The plug connectors at the top and bottom of the mandrel are encapsulated with rubber. Sealing is achieved through compression of the rubber parts.

In general, existing penetrator designs rely upon maintenance of contact force between an elastomeric sealing block, a conductor, conductor insulation, and an adjacent metal shell, initial sealing block contact force being established by mechanically compressing the sealing block. Maintenance of the contact force, and hence the seal integrity, during the life of the penetrator depends on the elastic properties of the elastomer of the sealing block. During periods of high operating temperature, the elastomeric sealing block expands, and the elastomeric material may take a compression set (a well-known property of elastomers). When this occurs, and the operating temperature returns to normal or lower temperature, the contact force will be insufficient to maintain the seal integrity. Consequently, leakage paths develop between adjacent internal parts, and the penetrator fails. An additional problem occurs when the sealing block is trapped within the shell of the penetrator with no expansion volume allowance and is exposed to hydrocarbons that cause swelling of the elastomer. Expansion of the elastomer in the absence of an expansion volume allowance causes mechanical or structural damage, such as extrusion of insulation off of current-carrying conductors of the penetrator and cracking of insulating materials in the penetrator shell.

BRIEF DESCRIPTION OF THE INVENTION

The present invention provides an electrical penetrator that avoids or substantially eliminates the foregoing and other problems inherent in prior electrical penetrators. In accordance with one of the broader aspects of the invention, an electrical penetrator comprises a tubular housing having an insulated conductor extending longitudinally through the housing, means supporting said conductor in the housing, and sealing means for sealing said conductor in said supporting means and for sealing said supporting means in said housing, said sealing means including elastomeric material that is expandible into a space within said housing and that is capable of undergoing a compression set, and means for resiliently restraining expansion of said elastomeric material into said space and for exerting a force on said elastomeric material to compensate for any tendency of the elastomeric material to undergo a compression set.

BRIEF DESCRIPTION OF THE DRAWINGS

The invention will be further described in conjunction with the accompanying drawings, which illustrate a preferred (best mode) embodiment, and wherein:

FIG. 2 is a transverse sectional view along line 2—2 of FIG. 1;

FIG. 3 is an end view of one of a pair of plugs shown in FIG. 1; and

FIG. 4 is a longitudinal sectional view of one of a plurality of tube fitting assemblies employed in the penetrator shown in FIG. 1.

DETAILED DESCRIPTION OF THE INVENTION

Figure 1:
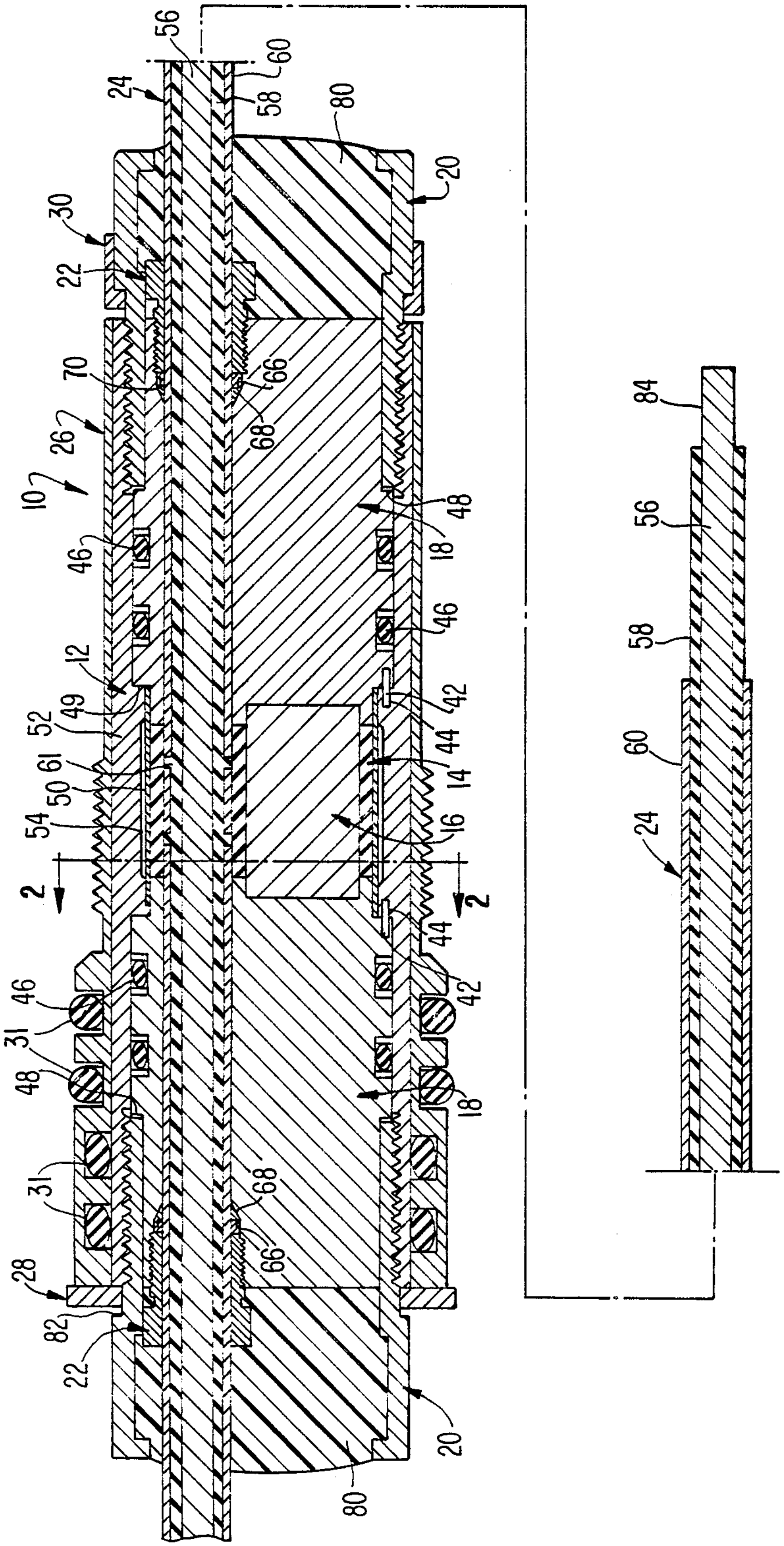
FIG. 1 is a longitudinal sectional view of an electrical penetrator in accordance with the invention.

Referring to the drawings, and as shown in FIG. 1, an electrical penetrator 10 in accordance with the invention comprises a tubular housing 12 in the form of a cylindrical metal shell, an elastomeric sealing member 14 (e.g., of rubber), a metal filler block 16, a pair of metal plugs 18, a pair of hollow metal end caps 20, compression tube fitting assemblies 22, metal-sheathed insulated conductors 24 (only one of which is shown in FIG. 1), a metal adapter sleeve 26, and metal stop rings 28 and 30. The adapter sleeve 26 and stop rings 28 and 30 facilitate the use of the penetrator in existing wellhead packers and are optional. If the adapter sleeve is used, O-rings 31 are placed in circumferential grooves of the adapter sleeve as shown. In the illustrative embodiment, the penetrator 10 is employed to transmit electricity through a barrier wall (not shown) by three conductors 24, that are shown in FIG. 2. Accordingly, filler block 16 has three arcuate cross-section grooves 32 in its outer surface that extend longitudinally of the housing 12 and that define three arms 34 equally spaced about the circumference of the filler block.

The filler block 16 is disposed centrally in the housing 12 (intermediate the opposite ends of the housing) and is surrounded by elastomeric material of the sealing member 14 as shown in FIG. 2. As is apparent, each of the grooves 32 is lined with elastomeric material of the sealing member, and cylindrical passages 36 are provided through the sealing member for receiving and surrounding the conductors 24. Plugs 18 have passages 38 therethrough aligned with corresponding passages 36. As shown in FIG. 3, each plug 18 has a three-armed recess 40 at the inner end of the plug, for receiving a corresponding end of the three-armed filler block 16 as shown in FIG. 1. Each plug 18 has locating pins 42 embedded in and projecting from its inner end. When the plug is inserted into the housing 12, pins 42 enter corresponding locating holes 44 of the housing, as shown in FIG. 1, to ensure proper alignment of plugs 18, housing 12, and filler block 16.

Plugs 18 are sealed within housing 12 by O-rings 46 supported in corresponding circumferential grooves on the outer cylindrical outer surface of the plugs. The hollow end caps 20 are threaded into housing 12, as shown in FIG. 1, and extend about reduced diameter outer portions of the plugs. The inner extremities of the end caps engage circumferential shoulders 48 of the plugs and urge the plugs into engagement with opposite ends of the elastomeric sealing member 14, placing the elastomeric material under compression. Movement of the plugs into the housing is limited by shoulders 49.

The elastomeric sealing member 14 is surrounded by a tubular metal spring 50, into which fit the inner ends of the plugs 18 as shown in FIG. 1. The central portion of the housing 12 has an internal circumferential boss 52 which supports opposite end portions of spring 50. The major portion of the spring (the portion surrounding the elastomeric sealing member 14) is separated from the boss by an annular space 54 that serves as an expansion volume for the elastomeric sealing member.

The metal-sheathed insulated conductors 24 extend longitudinally through the corresponding passages 36 and 38 in the sealing member 14 and the plugs 18. Each conductor 24 includes, integrally, a current-carrying conductive element 56 surrounded by conventional insulation 58 surrounded by a metal sheath 60, preferably of stainless steel. The conductors 24 are sealed into the plugs 18 by the tube fitting assemblies 22, one of which is shown in greater detail in FIG. 4. Each tube fitting assembly preferably comprises a threaded bushing or nipple 62, faceted at one end 64 so that it may be turned with a wrench, and a pair of clamping rings 66 and 68. Each tube fitting assembly 22 is slipped over a corresponding conductor 24 and inserted in a corresponding bore 70 formed in the outer end of a plug 18 as an enlargement of one of the passages 38. The components 62, 66, 68 are assembled so that ring 68 enters the bore first followed in sequence by ring 66 and bushing 62. The outer portion of each bore is threaded to receive the threaded bushing 62, and the inner portion of each bore is inwardly tapered. When the bushing is threaded tightly into the bore, pressure of the bushing on an outer end 72 of the ring 66 forces a tapered inner end 74 of the ring 66 into engagement with a corresponding tapered outer end 76 of ring 68, a tapered surface 78 of which is forced into engagement with a corresponding tapered surface of the inner portion of the bore. This action causes the rings 66 and 68 to be squeezed about the associated metal-sheathed insulated conductor 24 to clamp and seal the conductor into a plug 18. Thus the conductors 24 extend longitudinally through the housing 12, supported therein by a structure including the block 16 and plugs 18, and a sealing system (including components 14, 22, 46) seals the conductors in the supporting structure and seals the supporting structure in the housing.

After the tube fitting assemblies 22 have been mated with the plugs 18 in the manner just described, the end caps 22 are threaded into the housing 12, and the portions of the end caps extending outwardly beyond the plugs 18 are filled with a potting material, such as an epoxy resin 80, that seals the conductors 24 in the end caps.

As shown in FIG. 1, housing 12 is received within a conventional adapter sleeve 26, and the end caps 20 are inserted through stop rings 28 and 30 which fit between corresponding ends of the adapter sleeve 26 and shoulders 82 of the end caps. The complete assembly illustrated in FIG. 1 may then be inserted through a barrier wall, such as a downhole packer, in a well-known manner. The ends of each conductor 24, such as the end 84 shown in FIG. 1, are spliced in a conventional manner to conductors of cables, such as a downhole power cable and a surface power cable.

The metal sheath 60 of each conductor 24 may be circumferentially slotted, as shown at 61 in FIG. 1, so that the insulation 58 may be merged with the elastomeric material of the sealing member 14, for example by O-rings in the slots or by internal beads of the elastomeric material.

When the elastomeric material (e.g., rubber) is subjected to high temperatures and/or exposed to certain hydrocarbons, the elastomeric material expands or swells radially outward, against the resilient restraint of the spring 50, forcing the spring to expand outwardly into the space 54, which accommodates the thermal expansion and swelling of the elastomer. By virtue of the metal spring 50 (which is not prone to compression set), any tendency of the elastomer to undergo a compression set when subjected to elevated temperature or exposure to fluids which cause swelling is compensated. The physical properties of the non-elastomeric spring are not adversely affected by either temperature or well fluids, for example, and the spring return force is sufficient to maintain the contact pressure between the sealing member 14 and adjacent surfaces that is necessary to maintain a high pressure seal.

The load on the cylindrical metallic spring can be minimized by reducing the volume of the elastomeric material through the use of non-elastomeric fillers in the elastomeric material. Small metal microballoons, for example, may be mixed with the elastomer prior to its solidification. Non-elastomeric resilient fillers that are not prone to compression set when the elastomer is compressed may be used to provide an expansion volume and hence the force required for the sealing member to maintain a seal even though compression set of the elastomer has occurred. Although a cylindrical spring between the elastomeric material and a concentric (radial) expansion cavity is preferred, other arrangements may be employed, including metal bellows or diaphragms separating an axial expansion cavity or cavities from the sealing member at an end or ends of the sealing member.

Unlike conventional electrical penetrators that employ plugs having rubber sealing members and the like at opposite ends of a feedthrough mandrel, with inherent discontinuity of the insulation system in the mandrel, the conductor insulation of the electrical penetrator of the invention is continuous and uninterrupted, and the current-carrying conductors are not exposed internally of the penetrator. An advantage of the use of metal-sheathed insulated conductors is that high pressure seals can easily be made between the sheath and the sealing member and between the sheath and the penetrator housing as described earlier, or conventional seals, such as O-ring seals, may be used between metal-sheathed insulated conductors and surrounding passages of a metal block, and also between the block itself and the surrounding shell of the penetrator.

While a preferred embodiment of the invention has been shown and described, it will be apparent to those skilled in the art that changes can be made in the embodiment without departing from the principles and spirit of the invention, the scope of which is defined in the appended claims.

The invention claimed is:

1. An electrical penetrator comprising a tubular housing having an insulated conductor extending longitudinally through the housing, means supporting said conductor in the housing, and sealing means for sealing said conductor in said supporting means and for sealing said supporting means in said housing, said sealing means including elastomeric material that is expandible into a space within said housing and that is capable of undergoing a compression set, and means for resiliently restraining expansion of said elastomeric material into said space and for exerting a force on said elastomeric material to compensate for any tendency of the elastomeric material to undergo a compression set.

2. An electrical penetrator in accordance with claim 1, wherein said supporting means comprises a block through which said conductor extends, said block being surrounded by said elastomeric material.

3. An electrical penetrator in accordance with claim 2, wherein said restraining means comprises a tubular spring surrounding said elastomeric material, and wherein said space surrounds said spring.

4. An electrical penetrator in accordance with claim 3, wherein said elastomeric material also surrounds said conductor within said block.

5. An electrical penetrator in accordance with claim 4, wherein said conductor includes, integrally, a conductive element surrounded by insulation surrounded by a metal sheath.

6. An electrical penetrator in accordance with claim 5, wherein said metal sheath is interrupted by at least one circumferential slot having insulation therein merging the insulation of the conductor with the elastomeric material surrounding the sheath.

7. An electrical penetrator in accordance with claim 5, wherein said metal sheath is sealed in said supporting means by compression fitting means.

8. An electrical penetrator in accordance with claim 1, wherein said supporting means comprises a block in said housing intermediate opposite ends of the housing and a pair of plugs at opposite ends of said block, said conductor extending through said plugs and said block, and wherein said sealing means comprises components that seal said conductor in said plugs and in said block and components that seal said plugs in said housing.

9. An electrical penetrator in accordance with claim 8, wherein said elastomeric material of said sealing means surrounds s id block.

10. An electrical penetrator in accordance with claim 8, wherein said elastomeric material of said sealing means surrounds said conductor within said block.

11. An electrical penetrator in accordance with claim 8, wherein said elastomeric material of said sealing means is compressed between said plugs.

12. An electrical penetrator in accordance with claim 11, wherein said plugs are held in said housing by end caps attached to said housing, said conductor extending through said end caps and being sealed therein.

* * * * *